United States Patent [19]
Granston et al.

[11] Patent Number: 5,960,202
[45] Date of Patent: Sep. 28, 1999

[54] METHOD AND APPARATUS FOR AUTOMATICALLY LOGGING COMPILER OPTIONS AND/OR OVERRIDING COMPILER OPTIONS

[75] Inventors: Elana D. Granston, Sugarland, Tex.; Anne M. Holler, Santa Clara, Calif.

[73] Assignee: Hewlett Packard Company, Palo Alto, Calif.

[21] Appl. No.: 08/963,600

[22] Filed: Oct. 31, 1997

[51] Int. Cl.$^6$ ........................................................ G06F 9/45
[52] U.S. Cl. ............................................................ 395/705
[58] Field of Search ............................................... 395/705

[56] References Cited

U.S. PATENT DOCUMENTS

| | | | |
|---|---|---|---|
| 5,613,118 | 3/1997 | Heisch et al. | 395/709 |
| 5,815,720 | 9/1998 | Buzbee | 395/709 |
| 5,819,094 | 10/1998 | Sato et al. | 395/704 |
| 5,832,508 | 11/1998 | Sherman et al. | 707/200 |

OTHER PUBLICATIONS

Chang et al. Uding Profile Information to Assist Classic Code Optimizations, Software–Practice and Experience, pp. 1301–1321, Dec. 1991.

*Primary Examiner*—Robert W. Downs
*Assistant Examiner*—Wei Zhen

[57] ABSTRACT

The present invention provides a method and apparatus for automatically logging compiler options currently being used in a build environment and/or for replacing or supplementing the current compiler options with new compiler options without necessarily modifying the build environment. In accordance with a first embodiment of the present invention, a wrapper program is stored at a location in memory where the compiler program normally resides. Whenever a compiler user invokes the build process program, a command is generated which is intended to invoke the compiler program. However, instead of the compiler program being invoked by the command, the wrapper program is invoked. The wrapper program comprises a software routine which analyzes the compiler commands to determine which compiler options are designated in the compiler commands. The wrapper program causes a log file of the compiler options contained in the compiler commands to be generated, which is readable by a human and/or by a machine. The wrapper program then causes the compiler program to be invoked and the compiler program then performs its normal functions. The wrapper program may be separate from the compiler program or it may be part of the compiler program. The log file generated by the wrapper program can be modified by a compiler user such that the current compiler options are replaced or supplemented with new compiler options. When the build process program invokes the wrapper program, the wrapper program causes new compiler commands to be generated which comprises the new compiler options, which may be in lieu of or in addition to the compiler options contained in the original compiler commands. The wrapper program then causes the compiler program to be invoked and the compiler program then functions in the normal manner using the options comprised in the new compiler commands. Rather than using the log file to generate new compiler options to be used by the compiler program, an environment variable can be set so that each time a source file is compiled, the compiler option set in the environment variable is used by the compiler program.

23 Claims, 2 Drawing Sheets

METHOD AND APPARATUS FOR AUTOMATICALLY LOGGING COMPILER OPTIONS AND/OR OVERRIDING COMPILER OPTIONS

TECHNICAL FIELD OF THE INVENTION

The present invention generally relates to a method and apparatus for automatically logging compiler options and, more particularly, to a method and apparatus which automatically creates a log file of the compiler options currently being used in a build environment so that the options currently being used can be viewed by a person or a machine. The log file may then be modified to replace or supplement the options currently being used with new options such that the current options are overriden by the new options with or without modifying the original build environment.

BACKGROUND OF THE INVENTION

The task of determining which compiler options are currently enabled in a particular build environment often is a very difficult and time-consuming task. Information relating to which options are being used in a particular build environment generally is only provided during the initial build process when the compiler options are being set, and then only if the particular compiler explicitly provides this feature, which usually is not the case. Build environments frequently are very complex and hierarchical in nature. Furthermore, it is common for build environments to be modified over time by many different compiler users, potentially resulting in changes to the compiler options at various levels within the build environment. Also, it is possible for an option to be enabled at one level of a build environment and overriden at a lower level of the build environment.

Each compiler user who modifies a particular build environment may not be aware of all of the modifications which have previously been made to the particular build environment by other compiler users. Also, a compiler user might accidentally disable options which should be enabled. For example, a compiler user might disable a particular option to debug a program and forget to enable the option once the program has been debugged. Consequently, compiler users often do not know which compiler options are currently being used in a build environment.

Apparently, there are no tools currently available on the market which allow a compiler user to easily ascertain which compiler options are actually enabled in a build environment. It would be beneficial to provide compiler users with a tool that would allow them to determine which compiler options are currently being used in a build environment without requiring them to understand the build environment in order to determine which compiler options currently are being used.

Once it is known which compiler options are being implemented, the compiler user can more easily modify the current options in order to test other options in an effort to further optimize compiler performance. As time-consuming as it is to understand a build environment, it can be even more time-consuming to modify the build environment. Often, compiler users find it desirable to modify a build environment to substitute or add new compiler options. However, it is preferable to test the new options before actually modifying the build environment to include the new options. Therefore, it would be beneficial to provide a tool which would not only allow the compiler user to ascertain which compiler options are currently being used in a build environment, but which would also allow the compiler user to modify the current options to test new options without necessarily modifying the build environment to include the new options.

Accordingly, a need exists for a method and apparatus which will allow a compiler user to easily determine which compiler options are currently being implemented in a build environment while also allowing the compiler user to replace or supplement the current options with new options in order to test the build environment with the new options without modifying the build environment.

SUMMARY OF THE INVENTION

The present invention provides a method and apparatus for automatically logging compiler options currently being used in a build environment and/or for replacing or supplementing the current compiler options with new compiler options without necessarily modifying the build environment. In accordance with a first embodiment of the present invention, a wrapper program is stored at a location in memory where the compiler program normally resides. Whenever a compiler user invokes the build process program, a command is generated which is intended to invoke the compiler program. However, instead of the compiler program being invoked by the command, the wrapper program is invoked. The wrapper program comprises a software routine which analyzes the compiler commands being sent to the compiler program to determine which compiler options are designated in the compiler commands. The wrapper program causes a log file of the compiler options contained in the compiler commands to be generated, which is readable by a human and/or by a machine. The wrapper program then causes the compiler program to be invoked and the compiler program then performs its normal functions. The wrapper program may be separate from the compiler program or it may be part of the compiler program.

In accordance with another aspect of the present invention, the log file generated by the wrapper program can be modified by a compiler user such that the current compiler options are replaced or supplemented with new compiler options. When the build process program invokes the wrapper program, the wrapper program causes new compiler commands to be generated which comprise the new compiler options. The new compiler options may be in lieu of or in addition to the compiler options contained in the original compiler commands. The wrapper program then causes the compiler program to be invoked and the compiler program then functions in the normal manner using the options comprised in the new compiler commands.

In accordance with another embodiment of the present invention, one or more environment variables can be set designating that one or more new compiler options are to be used by the compiler program each time the compiler program compiles a source file to produce an executable file. Each time the wrapper program receives one or more particular compiler commands, the wrapper program generates one or more new compiler commands comprising the new compiler options. The new compiler options are then used by the compiler program when it compiles the source file.

Other aspects and advantages of the present invention will become apparent from the following description, drawings and claims.

DETAILED DESCRIPTION OF THE INVENTION

Figure 1:
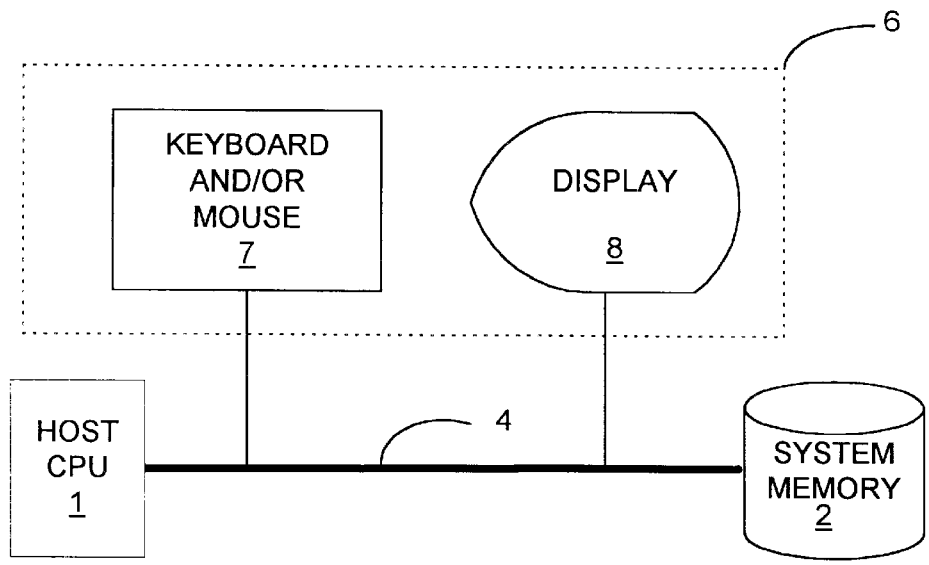
FIG. 1 is a block diagram illustrating the apparatus of the present invention which generates a log file of compiler options currently being used and/or replaces or supplements the current compiler options with new compiler options.

FIG. 1 is a block diagram functionally illustrating the apparatus of the present invention. The apparatus of the present invention comprises a central processing unit (CPU) 1 which receives input from a compiler user interface 6. The user interface 6 may comprises a keyboard and/or mouse 7 to allow the compiler user to input information into CPU 1 and a display 8 which displays information to the compiler user. The user interface 6 is in communication with CPU 1 via system bus 4. The host CPU 1 is in communication with a memory device 2 via bus 4. The memory device 2 stores one or more compiler programs and the wrapper program of the present invention.

Figure 2:
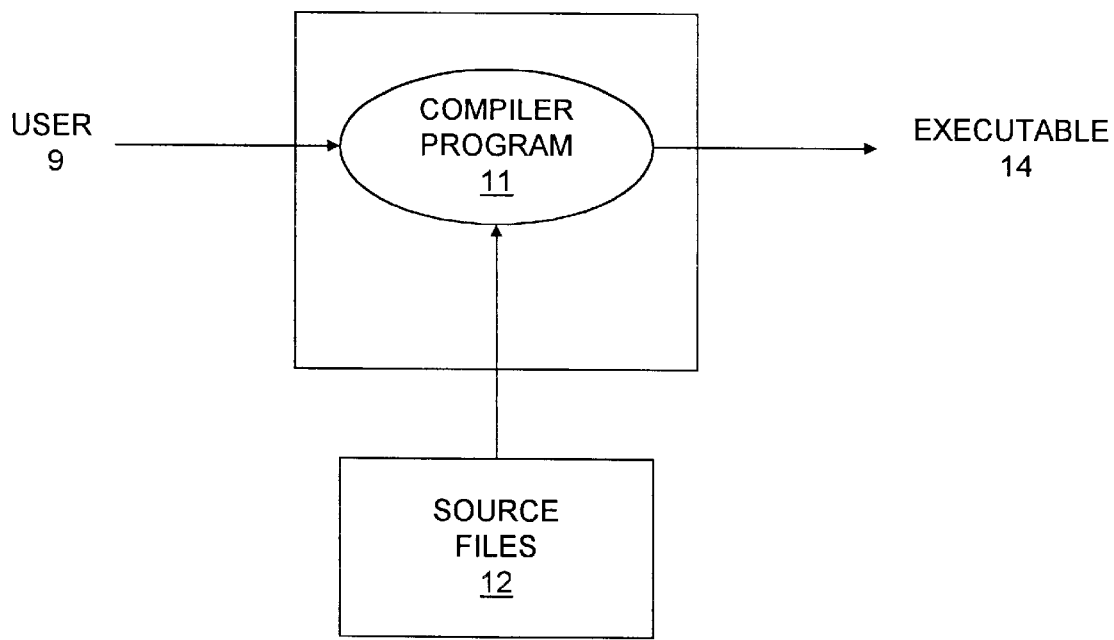
FIG. 2 is a block diagram which functionally illustrates the manner in which a typical build process program invokes a compiler program.

FIG. 2 illustrates a typical build process used to compile a computer program. Typically, when a compiler user 9 wishes to institute a build process, the user 9 enters instructions via the user interface 6 which are received by the host CPU 1. The CPU 1 then invokes a build process program which is stored in memory device 2. In turn, the build process program then causes the compiler program 11 to be invoked by the CPU 1. When invoking the compiler program 11, the CPU 1 passes a compiler command line to the compiler program 11 which instructs the compiler program 11 to use certain compiler options in compiling source files 12. The options that the compiler program 11 is instructed to use are those which have been enabled for the particular build environment. The compiler program 11 then compiles the source files 12 to produce an executable file 14.

Figure 3:
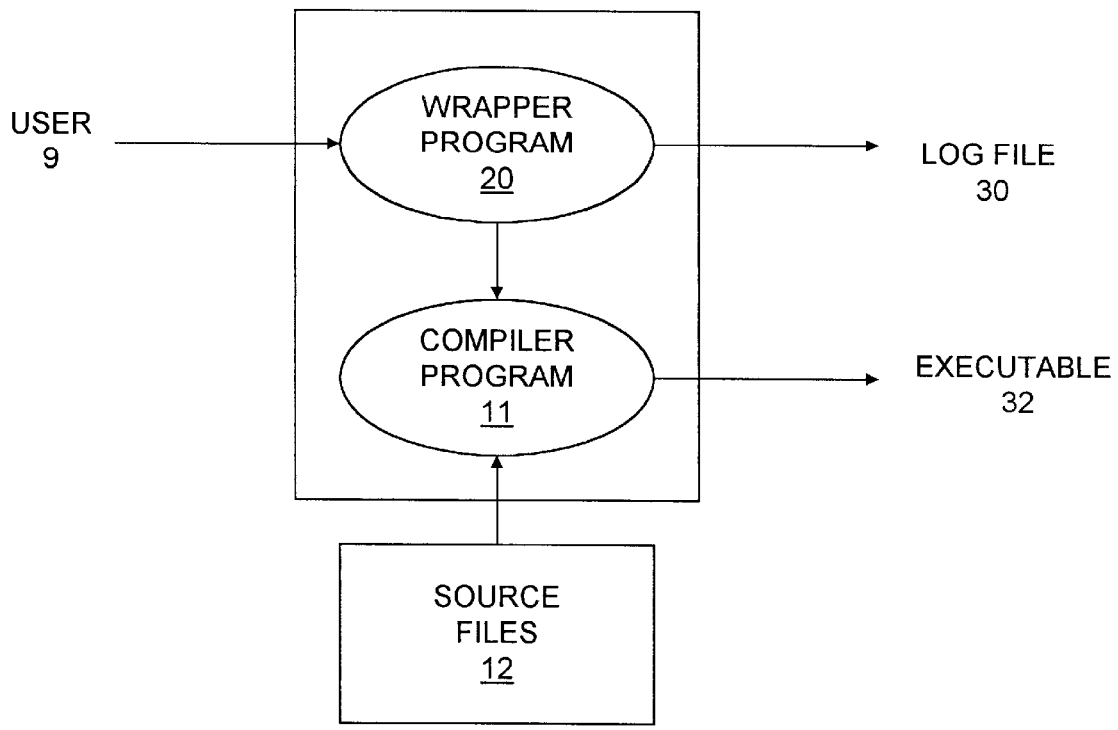
FIG. 3 is a block diagram which functionally illustrates the manner in which the wrapper program of the present invention operates in conjunction with a compiler program to generate a log file.

FIG. 3 illustrates the manner in which the wrapper program 20 of the present invention generates a log file which lists the compiler options being passed by the CPU 1 to the compiler program 11. The wrapper program 20 is a software routine stored at a particular location in memory device 2. In accordance with the present invention, the wrapper program 20 is stored at a first location in memory device 2 where the compiler program 11 normally resides. The compiler program 11 is stored at a second location in memory device 2. The compiler program 11 and the wrapper program 20 each may require a block of memory addresses in memory device 2.

When the user invokes the build process program (not shown), the build process program causes the CPU 1 to attempt to invoke the compiler program 11. However, since the wrapper program 20 is stored at the location in the memory device 2 where the compiler program 11 normally is stored, the CPU 1 causes the wrapper program 20 to be invoked. The CPU 1 then passes the compiler command line to the wrapper program 20. The wrapper program 20 analyzes the command line and determines which compiler options are contained in the command line. The wrapper program 20 then generates a log file 30 which lists the compiler options contained in the command line. The log file 30 may also contain information relating to the location at which the compiler option is being used with respect to the source file 12 being compiled. The log file 30 may then be printed out on a printer (not shown) and/or displayed on display device 8. It will be apparent to those skilled in the art, in view of the discussion provided herein, that any information deemed to be useful to the compiler user 9 may be listed in the log file 30.

Once the log file 30 has been generated, the wrapper program 20 causes the CPU 1 to invoke the compiler program 11. The compiler program 11 then compiles the source file 12 to produce an executable file 32.

Figure 4:
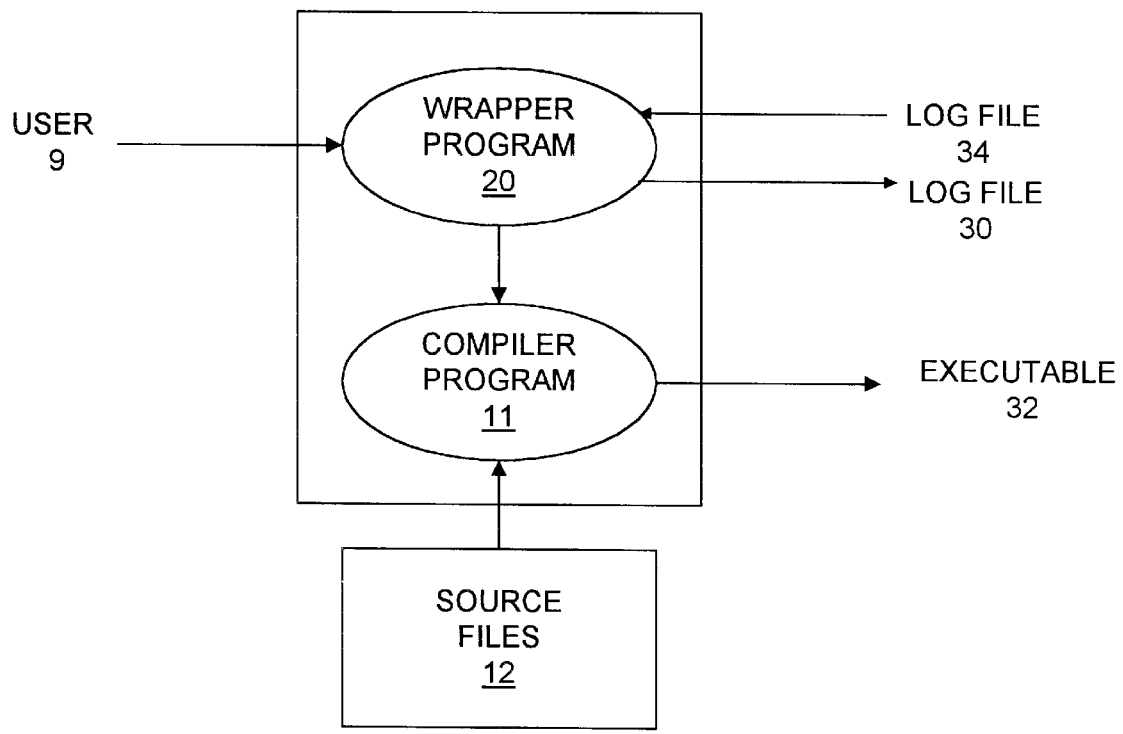
FIG. 4 is a block diagram which functionally illustrates the manner in which the wrapper program of the present invention utilizes the compiler options contained in the log file generated in accordance with the embodiment of FIG. 3 to produce a new set of compiler options to be used by the compiler program.

FIG. 4 is a block diagram which illustrates another embodiment of the present invention, wherein a log file generated in the manner discussed above with reference to FIG. 3 is used to override the compiler options contained in the command line being passed from the host CPU 1 to the compiler program 11. In accordance with this embodiment of the present invention, once a log file 30 has been generated, the log file 30 can be modified by the compiler user 9 via user interface 6 to replace or supplement the options listed in the log file 30 to generate a new log file 34. When the CPU 1 invokes the wrapper program 20, the wrapper program 20 generates the log file 30 in the manner discussed above. The user 9 may then modify the log file 30 to replace or supplement the compiler options listed in the log file 30 to produce log file 34. The new log file 34 is then utilized by the wrapper program 20 to generate a new compiler command line. The wrapper program 20 then causes the compiler program 11 to be invoked and passes the new compiler command line containing the new compiler options to the compiler program 11. The compiler program 11 then utilizes the new compiler options when compiling the source files 12.

In accordance with another embodiment of the present invention, the user 9 is provided with an option of setting an environment variable which instructs the wrapper program 20 to add a particular compiler option to the command line being passed to the compiler program 11. Therefore, every time the CPU 1 passes the command line containing the current compiler options to the wrapper program 20, the wrapper program 20 generates a new command line which is essentially the same as the original command line except that the new option is contained in the new command line.

Therefore, the present invention provides the user with several options which can be implemented during a build process. Specifically, the user 9 is provided with the options of instructing the wrapper program 20 to (1) take no action so that the compiler program 11 functions in the normal manner utilizing the original compiler options, (2) generate a log file of the current compiler options, (3) create a new compiler command line to be passed to the compiler program 11 which comprises the options contained in the log file, and (4) add an option each time a source file 12 is compiled in accordance with an environment variable set by the user. Furthermore, options 1–4 can be combined in any manner to suit the needs of the compiler user.

As stated above, the present invention is particularly useful when it is desirable to test new compiler options. When a compiler user 9 wishes to test certain compiler options, the compiler user 9 can simply modify the log file 30 generated by the wrapper program 20 to include the new options. The source files 12 will then be compiled using the new options. After the user 9 has tested the new compiler options, the user 9 can decide whether the new options should be incorporated into the build environment. If the user 9 wishes to incorporate the new options into the build environment, the user simply makes the appropriate selection via the user interface 6. The new options will then be used each time a source file 12 is compiled. If the user does not make this selection, the original compiler options will be used in any subsequent compilation.

It should be noted that the present invention has been described above with reference to particular embodiments but that the present invention is not limited to these embodiments. It will be apparent to those skilled in the art that modifications may be made to the embodiments discussed above which are within the spirit and scope of the present invention. It should also be noted that the wrapper program of the present invention can be separate from the compiler program or it can be incorporated into the compiler program as an integral part of the compiler program.

What is claimed is:

1. An apparatus for automatically logging compiler options currently being used by a compiler program to compile a source file, the apparatus comprising:

a memory device, the memory device having a compiler program stored therein; and a computer in communication with the memory device, wherein in order to compile a source file, the computer invokes the compiler program, the computer passing compiler commands to the compiler program, the compiler program analyzing at least one of the compiler commands to identify one or more compiler options contained in said at least one command, the compiler program generating a log file of the identified compiler options, the compiler program compiling the source file to create an executable file.

2. The apparatus of claim 1, wherein the computer comprises an interface for receiving input from a user and for outputting information to the user, the computer being in communication with a display device via the interface, the computer outputting the log file to the display device, the log file being displayed on the display device.

3. The apparatus of claim 2, wherein if the user does not want the log file to be generated, the user instructs the computer not to generate the log file during a compilation of a source file, wherein when the user instructs the computer not to generate the log file, the compiler program does not analyze any of the compiler commands to identify compiler options contained in the compiler commands and the log file is not generated.

4. The apparatus of claim 2, wherein the user can modify the log file to replace or supplement the compiler options listed in the log file with new compiler options, the compiler program generating new compiler commands based on the modified log file, wherein the new compiler commands contain the new compiler options, the new compiler commands being utilized by the compiler program when the compiler program compiles the source file to create an executable file.

5. An apparatus for automatically logging compiler options currently being used by a compiler program to compile a source file, the apparatus comprising:

a memory device, the memory device having a first group of memory addresses for storing a wrapper program and a second group of memory addresses for storing a compiler program; and a computer in communication with the memory device, wherein in order to compile a source file, the computer invokes the wrapper program, the computer passing compiler commands to the wrapper program, the wrapper program analyzing at least one of the compiler commands to identify at least one compiler option contained in said at least one command, the wrapper program generating a log file of the identified compiler option, the wrapper program invoking the compiler program, the wrapper program duplicating the compiler commands and passing the compiler commands to the compiler program, the compiler program compiling the source file to create an executable file.

6. The apparatus of claim 5, wherein the computer comprises an interface for receiving input from a user and for outputting information to the user, the computer being in communication with a display device, the computer outputting the log file via the interface to be displayed on the display device.

7. The apparatus of claim 6, wherein the user can modify the log file to replace or supplement the compiler options listed in the log file with new compiler options, the wrapper program generating new compiler commands based on the modified log file, wherein the new compiler commands comprise the new compiler options, the new compiler commands being utilized by the compiler program when the compiler program compiles the source file to create an executable file.

8. The apparatus of claim 7, wherein if the user does not want the log file to be generated by the wrapper program, the user instructs the computer not to generate the log file during a compilation of a source file, wherein when the user instructs the computer not to generate the log file, the wrapper program invokes the compiler program without analyzing any of the compiler commands to identify compiler options contained in the compiler commands and the log file is not generated by the wrapper program.

9. An apparatus for overriding current compiler options being used by a compiler program to compile a source file to create an executable file, the apparatus comprising:

a memory device, the memory device having a compiler program stored therein; and a computer in communication with the memory device, wherein in order to compile a source file, the computer invokes the compiler program, the computer passing compiler commands to the compiler program, the compiler commands containing one or more compiler options to be utilized by the compiler program, the compiler program replacing at least one of the compiler options with a new compiler option in response to a determination by the compiler program that said at least one compiler option is to be replaced with the new compiler option, the compiler program compiling the source file utilizing the new compiler option to create an executable file, wherein the compiler program analyzes an environment variable to determine whether said at least one compiler option is to be replaced with the new compiler option, the environment variable having a value which has been assigned to the environment variable by a compiler user, the compiler user setting the value of the environment variable via a user interface in communication with the computer.

10. The apparatus of claim 9, wherein the compiler program analyzes a log file to determine whether said at least one compiler option is to be replaced with the new compiler option, the log file containing a list of compiler options to be utilized by the compiler program in compiling a source file, the new compiler option being inserted in the log file by a compiler user, the compiler user inserting the new compiler option in the log file via a user interface in communication with the computer.

11. An apparatus for overriding current compiler options being used by a compiler program to compile a source file to create an executable file, the apparatus comprising:
   a memory device, the memory device having a first group of memory addresses for storing a wrapper program and a second group of memory addresses for storing a compiler program; and
   a computer in communication with the memory device, wherein in order to compile a source program, the computer invokes the wrapper program, the computer passing compiler commands to the wrapper program, the compiler commands containing at least one compiler option, the wrapper program generating a new compiler command containing a new compiler option, the new compiler option replacing said at least one compiler option, the wrapper program invoking the compiler program, the compiler program compiling the source file utilizing the new compiler option to create an executable file.

12. The apparatus of claim 11, wherein the wrapper program analyzes an environment variable to determine whether said at least one compiler option is to be replaced with the new compiler option, the wrapper program generating the new compiler command only if the environment variable indicates that said at least one compiler option is to be replaced with the new compiler option, the environment variable having a value which is set by a user via a user interface in communication with the computer.

13. The apparatus of claim 11, wherein the wrapper program analyzes a log file to determine whether said at least one compiler option is to be replaced with the new compiler option, the log file containing a list of compiler options to be utilized by the compiler program in compiling a source file, the new compiler option being inserted in the log file by a compiler user, the compiler user inserting the new compiler option in the log file via a user interface in communication with the computer.

14. A method for automatically logging compiler options being used by a compiler program to compile a source file to create an executable file, the method comprising the steps of:
   invoking a compiler program;
   executing the compiler program in a computer, the computer providing the compiler program with compiler commands, the compiler commands containing at least one compiler option to be utilized by the compiler program in compiling a source file;
   analyzing at least one of the compiler commands in the computer to identify compiler options contained in said at least one command, the computer analyzing said at least one command in response to executing one or more code segments contained in the compiler program;
   generating a log file of the identified compiler options, the log file being generated by the computer, the computer generating the log file in response to executing one or more code segments contained in the compiler program; and
   compiling the source file to create an executable file, the source file being compiled by the computer, the computer compiling the source file through execution of the compiler program.

15. The method of claim 14 further comprising the steps of:

outputting the log file to a display device in communication with the computer; and
   displaying the log file on the display device.

16. The method of claim 15 further comprising the step of:
   modifying the log file to replace or supplement the compiler options listed in the log file with new compiler options;
   generating new compiler commands based on the modified log file, the new compiler commands containing the new compiler options, the new compiler commands being utilized by the compiler program when the compiler program compiles the source file to create an executable file.

17. The method of claim 14, wherein if a user does not want the log file to be generated, the user instructs the computer via a user interface not to generate the log file during a compilation of a source program, wherein when the user instructs the computer not to generate the log file, the compiler program does not analyze any of the compiler commands and the log file is not generated.

18. A method for automatically logging compiler options being used by a compiler program to compile a source file to create an executable file, the method comprising the steps of:
   invoking a compiler program;
   executing the compiler program in a computer, the computer providing the compiler program with compiler commands, the compiler commands containing at least one compiler option to be utilized by the compiler program in compiling a source file;
   replacing said at least one compiler option with a new compiler option, said at least one compiler option being replaced with the new compiler option by the compiler program when the compiler program receives a modification command from the computer indicating that said at least one compiler option is to be replaced with the new compiler option, wherein the compiler program analyzes an environment variable to determine whether said at least one compiler option is to be replaced with the new compiler option, the environment variable having a value which has been assigned to the environment variable by a compiler user, the compiler user setting the value of the environment variable via a user interface in communication with the computer;
   executing the compiler program to compile the source file to create an executable file, the compiler program using the new compiler option in compiling the source file.

19. A computer-readable medium having a computer program stored therein, the computer program comprising:
   a first code segment for compiling a source file to create an executable file;
   a second code segment, the second code segment analyzing compiler commands to identify at least one compiler option contained in the compiler commands, the compiler commands being utilized by the first code segment when compiling the source file, the second code segment generating a log file which lists said at least one compiler option identified by the second code segment, the second code segment invoking the first code segment, wherein when the first code segment is invoked by the second code segment, the second code segment utilizes said at least one compiler option in compiling the source file to create the executable file.

20. The computer-readable medium of claim 19, wherein the second code segment modifies the log file to contain at least one new compiler option upon receiving a modification command from a computer executing the second code segment, the computer generating the modification command in response to input entered into the computer by a compiler user, the compiler user entering the input into the computer via a user interface, the second code segment generating a new compiler command which comprises the new compiler option, the first code segment using the new compiler option when compiling the source file to create the executable file.

21. A computer-readable medium having a computer program stored therein, the computer program comprising:

a first code segment for compiling a source file to create an executable file;

a second code segment, the second code segment receiving compiler commands from a computer, the compiler commands containing at least one compiler option, the second code segment modifying at least one of the compiler commands to include at least one new compiler option upon receiving a modification command from a computer executing the second code segment, the first code segment using the new compiler option when compiling the source file to create the executable file.

22. The computer-readable medium of claim 21, wherein the modification command is generated by the computer in response to the computer determining that an environment variable has been set to indicate that said at least one compiler option is to be replaced with said new compiler option.

23. The computer-readable medium of claim 21, wherein the modification command is generated by the computer in response to the computer determining that a user has entered modification information into the computer via a user interface in communication with the computer, the modification information entered by the user indicating that said at least one compiler option is to be replaced with the new compiler option.

* * * * *